(12) United States Patent
Feldman et al.

(10) Patent No.: US 12,073,258 B2
(45) Date of Patent: Aug. 27, 2024

(54) CONFIGURATION MAP BASED SHARDING FOR CONTAINERS IN A MACHINE LEARNING SERVING INFRASTRUCTURE

(71) Applicant: Salesforce, Inc., San Francisco, CA (US)

(72) Inventors: Yuliya L. Feldman, Campbell, CA (US); Seyedshahin Ashrafzadeh, Foster City, CA (US); Alexandr Nikitin, El Sobrante, CA (US); Manoj Agarwal, Cupertino, CA (US)

(73) Assignee: Salesforce, Inc., San Francisco, CA (US)

( * ) Notice: Subject to any disclaimer, the term of this patent is extended or adjusted under 35 U.S.C. 154(b) by 505 days.

(21) Appl. No.: 17/334,592

(22) Filed: May 28, 2021

(65) Prior Publication Data

US 2022/0382601 A1 Dec. 1, 2022

(51) Int. Cl.
*G06F 9/50* (2006.01)
*G06N 5/04* (2023.01)
*G06N 20/00* (2019.01)

(52) U.S. Cl.
CPC ............. *G06F 9/5083* (2013.01); *G06N 5/04* (2013.01); *G06N 20/00* (2019.01)

(58) Field of Classification Search
CPC ....... G06F 9/5083; G06F 9/5077; G06N 5/04; G06N 20/00; H04L 67/1004
See application file for complete search history.

(56) References Cited

U.S. PATENT DOCUMENTS

| | | | |
|---|---|---|---|
| 7,730,478 B2 | 6/2010 | Weissman | |
| 2004/0193819 A1* | 9/2004 | Marinescu | G06F 12/0253 711/E12.009 |
| 2016/0105801 A1* | 4/2016 | Wittenberg | H04W 4/029 455/411 |
| 2017/0031908 A1* | 2/2017 | Liu | G06F 16/2255 |
| 2018/0349168 A1* | 12/2018 | Ahmed | G06F 11/3006 |
| 2019/0042322 A1* | 2/2019 | Calhoun | H04L 41/0896 |
| 2019/0138934 A1* | 5/2019 | Prakash | G06F 9/5072 |
| 2019/0156247 A1* | 5/2019 | Faulhaber, Jr. | G06N 3/08 |
| 2019/0243972 A1* | 8/2019 | Krylov | G06N 20/00 |
| 2019/0318240 A1* | 10/2019 | Kulkarni | G06N 3/08 |
| 2019/0319837 A1* | 10/2019 | Stoicov | H04L 41/22 |
| 2019/0319892 A1* | 10/2019 | Ganguli | H04L 47/83 |

(Continued)

OTHER PUBLICATIONS automl.org, "AutoML . . . ", AutoML.org: Freiburg-Hannover, Available Online at <https://www.automl.org>, retrieved on Mar. 9, 2021, 1 page.

(Continued)

*Primary Examiner* — Tuan C Dao
(74) *Attorney, Agent, or Firm* — Nicholson, De Vos, Webster & Elliott, LLP

(57) ABSTRACT

A machine learning serving infrastructure implementing a method of receiving or detecting an update of container metrics including resource usage and serviced requests per model or per container, processing the container metrics per model or per container to determine recent resource usage and serviced requests per model or per container, and rebalancing distribution of models to a plurality of containers to decrease a detected load imbalance between containers or a stressed container in the plurality of containers.

18 Claims, 8 Drawing Sheets

(56) References Cited

U.S. PATENT DOCUMENTS

| | | | |
|---|---|---|---|
| 2020/0027210 A1* | 1/2020 | Haemel | G06F 9/547 |
| 2020/0293828 A1* | 9/2020 | Wang | G06N 3/04 |
| 2020/0311617 A1* | 10/2020 | Swan | G06F 9/45558 |
| 2021/0012239 A1* | 1/2021 | Arzani | H04L 43/50 |
| 2021/0089921 A1* | 3/2021 | Aghdasi | G06N 5/04 |
| 2021/0224818 A1* | 7/2021 | Choudhary | G06F 16/3329 |
| 2021/0275918 A1* | 9/2021 | Devaranjan | G06T 15/205 |
| 2022/0237505 A1 | 7/2022 | Feldman et al. | |
| 2022/0237506 A1 | 7/2022 | Feldman et al. | |
| 2022/0318647 A1 | 10/2022 | Ashrafzadeh et al. | |
| 2022/0382539 A1 | 12/2022 | Gumashta et al. | |

OTHER PUBLICATIONS

Microsoft Research, "AutoML", Available Online at <https://www.microsoft.com/en-us/research/project/automl/>, retrieved on Mar. 9, 2021, 2 pages.

Nabar, Shubha, "Open Sourcing TransmogrifAI: Automated Machine Learning for Structured Data", Available Online at <https://engineering.salesforce.com/open-sourcing-transmogrifai-4e5d0e098da2>, Aug. 16, 2018, 10 pages.

* cited by examiner

CONFIGURATION MAP BASED SHARDING FOR CONTAINERS IN A MACHINE LEARNING SERVING INFRASTRUCTURE

TECHNICAL FIELD

One or more implementations relate to the field of machine learning servicing infrastructures; and more specifically, to a method and system for routing requests to servicing containers implemented in a machine learning serving infrastructure.

BACKGROUND ART

Containers are a logical packaging in which applications can execute that is abstracted from the underlying execution environment (e.g., the underlying operating system and hardware). Applications that are containerized can be quickly deployed to many target environments including data centers, cloud architectures, or individual workstations. The containerized applications do not have to be adapted to execute in these different execution environments as long as the execution environment support containerization. The logical packaging includes a library and similar dependencies that the containerized application needs to execute.

However, containers do not include the virtualization of the hardware of an operating system. The execution environments that support containers include an operating system kernel that enables the existence of multiple isolated user-space instances. Each of these instances is a container. Containers can also be referred to as partitions, virtualization engines, virtual kernels, jails, or similar terms.

Machine learning is a type of artificial intelligence that involves algorithms that build a model based on sample data. This sample data is referred to as training data. The trained models can generate predictions, a process also referred to as scoring, based on new data that is evaluated by or input into the model. In this way, machine learning models can be developed for use in many applications without having to be explicitly programmed for these uses.

Containers can be used in connection with machine-learning serving infrastructure. Machine-learning serving infrastructures enable the execution of machine-learning models and provide services to the machine-learning models. Each machine-learning model can be separately containerized with all its required dependencies.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

Figure 1:
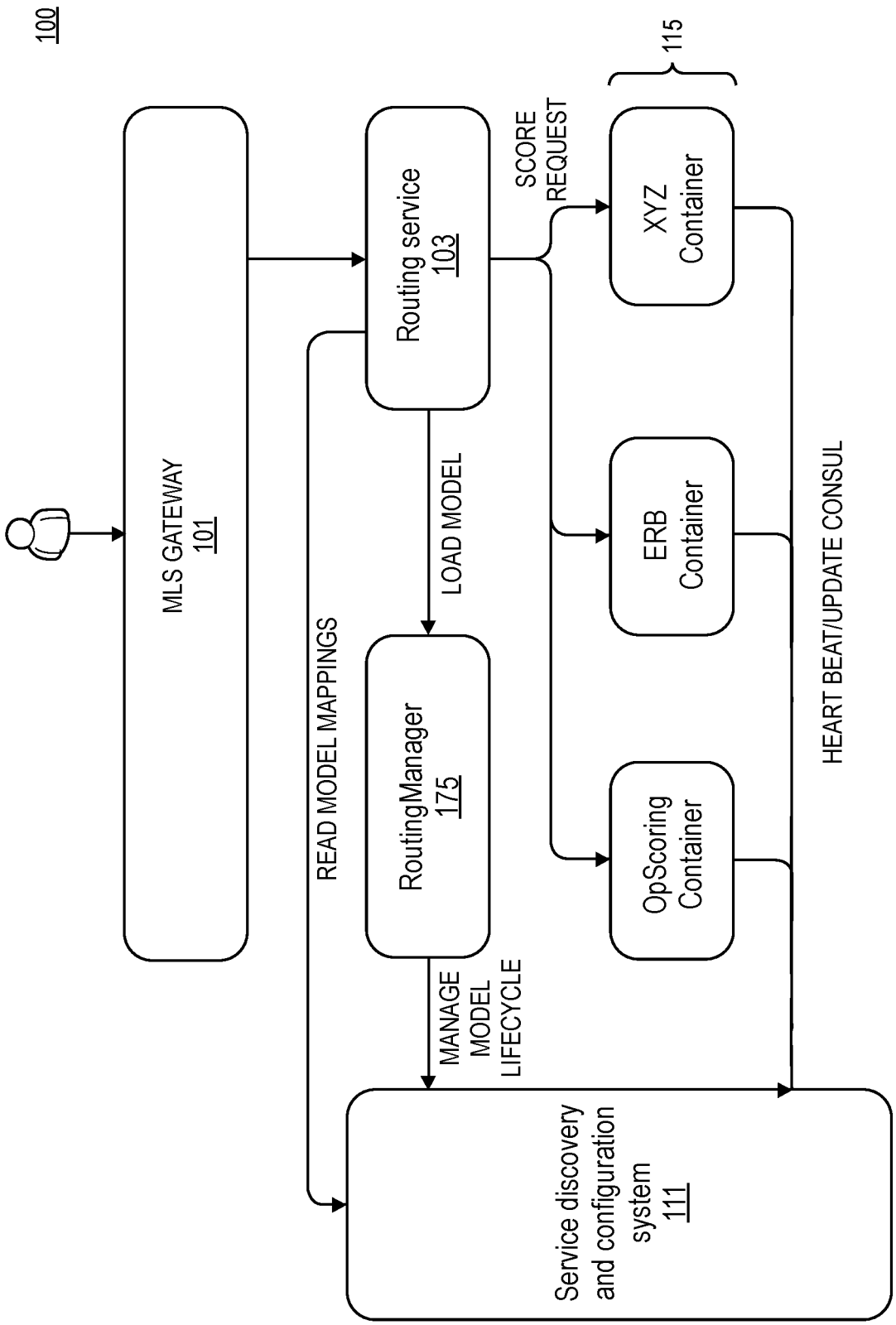
FIG. 1 is a diagram of one example implementation of a machine-learning serving infrastructure that supports a multi-tenant system.

The following description describes implementations for a method and process for managing a distribution of machine learning (ML) models in an ML serving infrastructure. The implementations for the method and process of managing a distribution of ML models in the ML serving infrastructure introduces a routing manager to the ML serving infrastructure. The routing manager manages the available set of containers for the ML serving infrastructure and the allotment of ML models across these containers. The routing manager can track and manage any number of containers having any variety of resource capacities. This can be expressed as n containers with resource capacities $c_1$, $c_2, \ldots, c_n$. In addition, any number and variety of ML models can be supported by the ML serving infrastructure using the set of available containers. A 'set,' as used herein can include any positive whole number of items including one item. The number of models can be expressed as m different models with demands $d_1, d_2, \ldots, d_m$. Resource capacities in this case could be static values specific to the containers like memory, processor availability, requests per second (RPS), and similar resources or metrics.

The routing manager can use these expressions of the demands, resources, and capacities to make a determination of the assignment of ML models to containers. The assignment of ML models to the containers can be characterized as a mapping of the ML models into the containers so that all the ML models demand can be satisfied based on the available capacity of the containers. The mapping can be configured to have specific properties. The specific properties can include that the ML models need to be mapped (e.g., using hashing) to the same containers to reduce model loading hits. The containers can only support ML models up to their capacity. The routing manager can handle resulting hot partition issues. The routing manager can dynamically scale up/down the replication number of models to accommodate their demand. The routing manager can handle failures of the containers by re-balancing ML models across the available containers. In addition, the routing manager can support different ML model types/versions (e.g., ML models based on AutoML, TensorFlow, and similar technologies).

Where ML models are utilized in support of applications, there are a wide variety of variety of ML frameworks or libraries (e.g., TransmogrifAI/SparkML Lib, TensorFlow, XGBoost), APIs (HTTP/gRPC, Java interface), programming languages (Java, Python), and related technologies that can be employed any combination. There can be multiple groups that are creating ML models that will be deployed in the same ML serving infrastructure such as in the case where the ML serving infrastructure supports multi-tenancy. The ML models can have different requirements, use cases, and needs. Hence there can be multiple ways to integrate ML models and serve them.

As used herein, an application can be any program or software to perform a set of tasks or operations. A machine-learning (ML) model can be a set of algorithms and statistical data structures that can be trained to perform a specific task by identifying patterns and employing inference instead of using explicit instructions. The ML model can be trained for the task using a set of training data.

A machine-learning (ML) serving infrastructure can be automated and organized to support multi-tenancy where containers can be used to execute the ML models that can service the applications and users of tenants in a multi-tenant system. Within a multitenant system, a software application is designed to provide each tenant with a tenant-specific view of the application including access only to tenant-specific data, configuration, user management, and similar tenant properties and functionality. A tenant can be a group of users who are part of a common organization or share common access privileges to the multi-tenant system and the associated software applications.

FIG. 1 is a diagram of one example implementation of an ML serving infrastructure that supports a multi-tenant system. The machine-learning serving infrastructure 100 includes a machine-learning service (MLS) gateway 101, routing service 103, routing manager 175, service discovery and configuration system 111, set of serving containers 115, and data stores, along with other supporting infrastructure.

A serving container 115 can be an isolated execution environment that is enabled by an underlying operating system, and which executes the main functionality of a program such as an ML model. A serving container 115 can host any number of ML models for any number of tenants. Serving containers 115 can be organized as a cluster. The cluster can be a group of similar entities, such that a cluster of serving containers can be a group of serving container instances or similar grouping. An ML serving infrastructure 100 can host any number of serving containers 115 or clusters of serving containers. Different clusters can host different versions or types of ML models.

In some example implementations, a cluster of serving containers 115 can host all ML models of the same version for all tenants. This organization of the cluster can be limited by the number of ML models that a single-serving container can hold. The ML serving infrastructure 100 can scale to accommodate further additions of ML models even in cases where the number or variety of ML models exceed the capacity of the serving containers 115 in the cluster. Since each ML model's size, which can range from hundreds of kilobytes (KB) to hundreds of megabytes (MB), initialization time, and the number of requests that are serviced, can vary widely based on each tenant's underlying database and usage, some clusters of serving containers 115 may have a high resource usage, while other clusters of serving containers 115 may have a low resource utilization. The resource usage, failure, or addition of any server container in a cluster of serving containers can create the need to rebalance the supporting resources in the clusters of serving containers. When changes in the number or resource usage of the serving containers 115 are implemented, then the routing service 103 can manage the load balancing and routing of requests according to the changes in the organization of the serving containers.

A routing service 103 can be implemented as a set of routing containers, or cluster of routing containers, each implementing instances of the routing service 103 functions or subsets of these functions. The routing service 103 can authenticate any request from any tenant, and then route the request for service by ML models to any serving container 115 in a cluster of serving containers.

The ML serving infrastructure 100 receives requests from tenants via a machine-learning service (MLS) gateway 101 or a similar interface. The MLS gateway 101 or similar interface receives a request from a tenant application and identifies a version or instance of a ML model associated with the request. The MLS gateway 101 or similar interface identifies model information associated with ML models corresponding to a cluster of available serving containers associated with the version of the ML model. The MLS gateway 101 uses the model information to select a serving container from the cluster of available serving containers. If the ML model is not loaded in the serving container, the ML serving infrastructure 100 loads the ML model in the serving container. If the ML model is loaded in the serving container, the system executes, in the serving container (e.g., 105A-C), the ML model (e.g., the scoring models 133) on behalf of the request. The ML serving infrastructure 100 responds to the request based on executing the appropriate ML model on behalf of the request.

In one example, the ML serving infrastructure 100 receives a request for scoring a business opportunity from a Customer Relationship Management (CRM) application or similar application and identifies the request requires executing a version of a particular opportunity scoring ML model. The routing service 103 identifies ML model information including memory and CPU requirements for the scoring ML models in the cluster of scoring serving containers. The routings service 103 applies a load balancing algorithm, resource management algorithm (e.g., a multi-dimensional bin-packing algorithm) to the collected model information to select the serving container 115 that has the best combination of available resources to execute a copy of the specific ML model associated with an incoming request.

If a copy of the specific ML model needed to service the incoming request is not already loaded in a serving container 115, then an existing or new serving container loads the required ML model. When a copy of the specific ML model is verified to be loaded in the serving container, then the specific ML model executes the requested service or function, as specified in the received request, in the serving container. A score or similar prediction is thereby generated by the ML model and the ML serving infrastructure 100 can then respond to the request with the generated score via the MLS gateway 101.

The ML serving infrastructure 100 can be implemented in a cloud computing environment in which data, applications, services, and other resources are stored and delivered through shared data centers. The ML serving infrastructure 100 can be implemented via any other type of distributed computer network environment in which a set of servers control the storage and distribution of resources and services for different client users.

The clusters of the example implementation of the ML serving infrastructure 100 can be two of any number of clusters that are serving containers for scoring services. Where a scoring service can be a serving container for any number of ML models that perform scoring, i.e., scoring models. Each cluster can execute different sets of scoring services (e.g., different serving containers) for executing different varieties of ML models (e.g., scoring models). An incoming request can be serviced by a single ML model of a single cluster (e.g., a scoring model of a given scoring service) or the incoming request can be sub-divided to be serviced by multiple clusters, service containers, and ML models. In some implementations, the clusters and serving containers operate other similar types of ML models other than scoring ML models such as ranking and recommendation models. Scoring is provided as an example rather than by limitation. The clusters can include in some implementations ranking services and recommendation services, which support ranking models, and recommendation models, respectively. In the illustrated example, the OpScoring container is an example of a scoring container, the ERB container can implement ranking or other functions, and other functions can be supported in other container types (e.g., XYZ container can represent any type of container).

In some implementations, the routing service 103 can split the incoming request into separate sub-requests, and then route the sub-requests to their corresponding clusters of serving containers. Although these examples describe the clusters 115 of serving containers that serve one version of the scoring type of ML models, one version of the recommending type of ML models, and one version of the ranking type of machine-learning models, any clusters of any serving containers may serve any number of versions of any number of any types of any ML models and all permutations thereof.

In some implementations, each of the serving containers 115 registers with service discovery and configuration system 111 by providing the serving container's registration information, such as the host, the port, functions, or similar information. When any of the serving containers 115 is no longer available or becomes unavailable, the discovery and configuration system 111 deletes the unavailable serving container's registration information. An available serving container 115 can be referred to as an actual serving container. In other embodiments, a registration process is not required and the service discovery and configuration system 111 can monitor the loading of containers and models to collect the characteristics of each that enable proper routing of requests to these containers and models.

The service discovery and configuration system 111 can be implemented by HashiCorp Consul, Apache Zookeeper, Cloud Native Computing Foundation etcd, Netflix eureka, or any similar tool that provides service discovery and/or a service registration system. The discovery and configuration system 111 can track container information about each serving container and model information about each serving container's machine-learning models. In other implementations, this information can be stored in other locations such as datastore using a format or organization. Container information can be data about an isolated execution environment, which executes the main functionality of an ML model. ML model information can be data about the algorithms and/or statistical models that perform a specific task effectively by relying on patterns and inference instead of using explicit instructions.

The routing service 103 can be deployed with multiple redundant and/or distributed instances so that it is not a single point of failure for the ML serving infrastructure 100. In some implementations, one instance of the routing service 103 acts as a master, while other instances of the routing service 103 are in a hot standby mode, ready to take over if the master instance of the routing manager fails, or perform some operations at the direction of the master instance.

The routing manager 175 103 makes decisions to load, rebalance, delete, distribute, and replicate ML models in the serving containers 115. These decisions can be based on the information provided to the routing service 103 and routing manager 175 by the serving containers 115 and other elements of the ML serving infrastructure 100. The data model information in the service discovery and configuration system 111 provides information about which serving containers 115 are expected to host-specific ML models and which serving containers actually host the specified ML models. The routing manager 175 can also send a list of expected ML models to a model mapping structure in the discovery and configuration system 111. Each of the serving containers 115 can manage a list of executing ML models. If the serving container list does not match the list of expected ML models that a serving container receives, the serving container can load or delete any ML models as needed, and then update its list of executing ML models accordingly. The routing manager 175 can monitor and maintain each serving container's list of actual ML models to determine where to route requests.

The routing manager 175 can analyze the model information about each ML model to decide whether to replicate frequently used ML models to additional serving containers to prevent overloading the serving containers which are hosting the frequently used ML models. The routing manager 175 can use the data model information of the service discovery and configuration system 111 to manage lists of available ML models and available serving containers. Every time a ML model is loaded, the serving container registers the ML model in the data model information or the data model information is similarly updated. Therefore, the routing service 103 can route requests for a particular ML model to the serving containers.

When any of the executing serving containers 115 in any of the executing clusters of serving containers dies unexpectedly, or gracefully, the serving container's heartbeat to the service discovery and configuration system 111 fails. The ML serving infrastructure 100 removes the data for the failed serving container from its directory, files, or similar data structures in the service discovery and configuration system 111. Based on a review of overall resource usage amongst the serving containers 115, the routing manager 175 can respond by rebalancing the serving containers 115 in terms of assigned ML models.

When requests are received by the routing service 103 via the MLS gateway 101, a check of the mapping managed by the routing manager 175 is made to determine if a requested ML model is executing using the service discovery and configuration system 111. If found, then the routing service 103 can forward the requests (or divide the request into a set of sub-requests) to the identified serving containers 115. If a ML model for the request is not found, then the routing manager 175 can load the ML model from a datastore, specialized database, or store (e.g., a simple storage service (S3)), or similar location into a selected cluster and serving container.

The processes described herein as being performed by the routing manager 175 can be performed solely by the routing manager 175, in conjunction with other components such as the routing service 103, or in other combinations. Further, the routing manager 175 is shown as a separate component of the ML serving infrastructure 100, however, the routing manager 175 and any of its processes and functions can be subcomponents of other components such as the routing service 103 rather than discrete components. One skilled in the art would appreciate that the example implementations are provided by way of illustration and not limitation and that other implementations are consistent with that which is described herein.

In some implementations, the ML serving infrastructure 100 can include any number of additional supporting features and functions. These additional supporting features and functions can include application services, version management services (VMS), redistribution services, and similar functions and services. The application services can be any number, combination, and variety of functions and services for supporting tenant applications and the ML serving infrastructure 100. The VMS can be any number, combination, and variety of functions and services for supporting different versions of ML frameworks, ML models, and similar components of the machine-learning serving infrastructure 100. The redistribution services can be any number, combination, and variety of interconnecting services to enable communication between the components of the ML serving infrastructure 100 and supporting components. In some example implementations, serving containers can interface with or support metrics bus clients, databus clients, and similar components. The metrics bus clients can be services that gather or monitor metrics of the serving containers 115 and similar aspects of the ML serving infrastructure 100. Similarly, the databus clients can be services and functions that enable data communication and access between the serving containers 115 and other components of the ML serving infrastructure 100.

Figure 2:
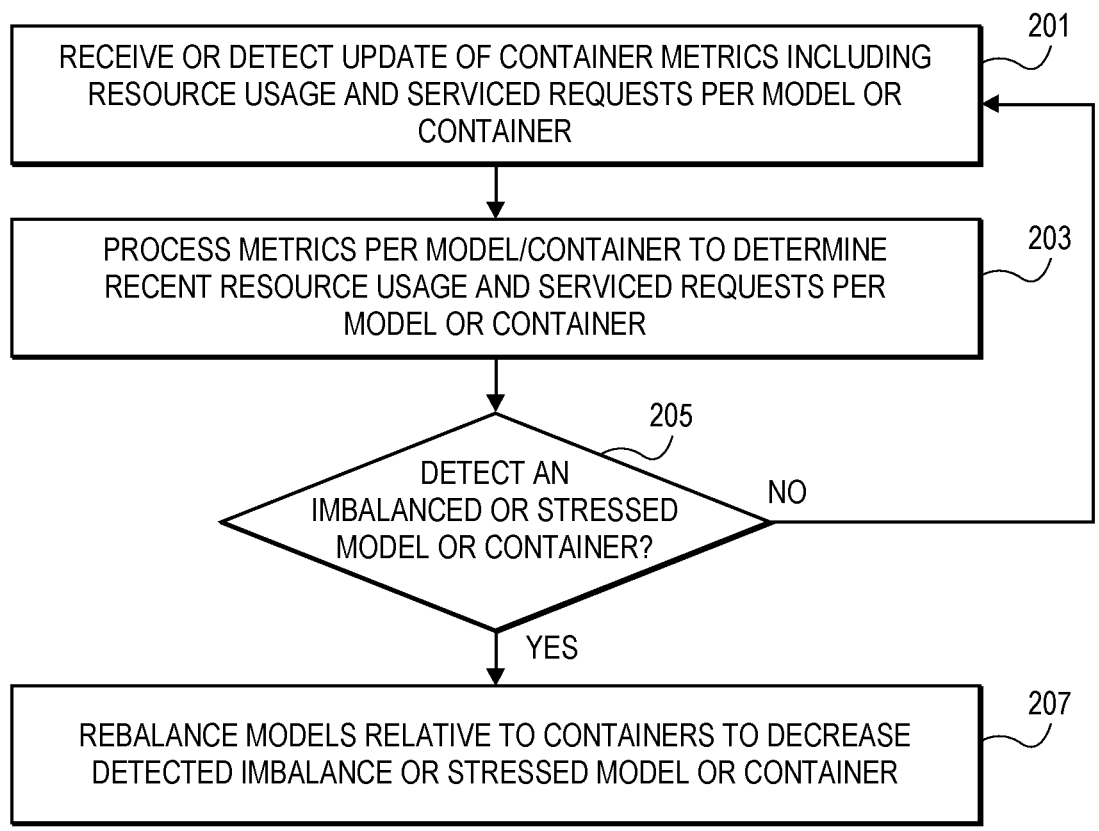
FIG. 2 is a flow diagram illustrating a process of a routing manager and/or routing service according to some example implementations.

FIG. 2 is a flow diagram illustrating a process of a routing manager according to some example implementations. This process relates the balancing/rebalancing processes of the routing manager. The routing manager also manages other processes including loading of ML models as further described herein. In this example implementation, the balancing process can be initiated in response to receiving or detecting an update of the container and/or ML model metrics including metrics for container resource usage, ML model demands, serviced requests, and similar metrics collected per container and/or per ML model (Block 201). The collected metrics can be processed to determine the metrics per ML model and/or container to determine recent or current container resource usage, serviced requests, ML model demands, and similar metrics per container and/or ML model (Block 203). The process can then determine whether there is an imbalance in resource usage across containers, a stressed container, or similar issue with the current distribution (Block 205). If no imbalance between containers or ML models is found and no container or ML model is stressed, then the process awaits a further update of the container and/or ML model related metrics. If an imbalance between containers or ML models if found or a container or ML model is stressed, then the process initiates a rebalancing of the ML models relative to the assigned containers to decrease the imbalance or to relieve stress on an ML model or container (Block 207).

Several mechanisms can be utilized to determine whether there is an imbalance between ML models and/or containers or to determine whether a particular ML model or container is stressed. Imbalance parameters can be configurable by administrators, users of the ML models, or similar entities. In the case of imbalances, the ML model demands can be within the container resources for the current ML model assignments, but there can be instances of ML models or containers that have high usage or demands within the set of available ML models and containers while other ML models and containers have low usage or demands. Where there is a delta or difference between the high and low usage ML models and containers that exceeds a defined threshold or where there is a delta between the high and low usage ML models and containers relative to an average of the usage of ML models and containers, then an imbalance can be identified. A 'stressed' ML model or container can be an ML model with a usage rate above or near a defined threshold. Similarly, a stressed container can be a container where ML model demand is near or exceeds the container resources.

Rebalancing can move ML models from one high usage or resource constrained container to a low usage or resource abundant container. Rebalancing can also be an alteration of the routing of the requests to ML models and containers. Rebalancing takes into consideration that the received requests are specific to an ML model, thus, rerouting of such requests must be to another instance of the same ML model. Similarly, rebalancing takes into consideration that some ML models are supported by a specific set of containers, thus, moving an ML model between containers must be consistent with this support. In each case, the routing manager tracks an expected ML model to container allotment that is based on an initial allotment of the ML models to the containers, as well as an actual ML model to container allotment that reflects the current allotment.

There can be an upper limit on the number of ML models that can be handled efficiently by a single serving container (e.g., 1000 models in a serving container). Thus, to provide scalability the implementations provide a method to support more instances of an ML model than a single container can handle. The method and system provide a mechanism to divide and manage subset of ML models separately.

As discussed above, this problem can be expressed as a model that the processes and systems can utilize to manage the ML models across the serving containers. The ML serving infrastructure can have n serving containers with capacities $c_1, c_2, \ldots, c_n$ and support m different ML models with demands $d_1, d_2, \ldots, d_m$. The method and system provide a consistent mapping of ML models into the serving containers so that all models demand can be handled based on the available serving container capacity. The method and process have properties including that the ML models are mapped (e.g., hashed) to the same serving containers to reduce ML model loading hits (i.e., frequency). Serving containers can only support up to their capacity. The method and system can handle hot partition issues. The method and system dynamically scale up/down the replication number of ML models to accommodate their demands. The method and system handle failures by re-balancing ML models across the serving containers. The method and system can support different model types/versions (like AutoML, Tensorflow, and similar ML frameworks). These methods and systems are implemented by the routing manager in the example implementations.

In handling the balancing and loading of ML models, the routing manager can operate on certain assumptions related to scale. The size of ML models can vary from each other by several orders of magnitude. The model sizes can vary from several hundred megabytes (MBs) to several hundred kilobytes (KBs). The demand for each model can also vary by several orders of magnitude from one model to another. The overall ML serving infrastructure could support more than a hundred thousand models per month or similar timeframe. The ML serving infrastructure can support any maximum requests per second (RPS) in total and any maximum RPS per tenant.

In some use cases, the routing manager can partition ML models into subset of containers with consistent mapping, manage ML model lifecycle considering model popularity (i.e., frequency of use) and overall capacity and load, replicate ML models in case of increased demand, downscale/destroy ML models in case of low load (i.e., low popularity). The routing manager can also rebalance ML models in case of serving container failures or new added serving containers, and support different model types and ML frameworks like AutoML, recommender, and similar technologies.

The routing manager can use different criteria to optimize balance for (e.g., memory usage, demand, and similar metrics). The routing manager can use bin packing algorithms to solve balancing problems over these metrics. Any bin packing algorithm can be utilized including first fit, best fit, and worst fit. Best fit is a greedy algorithm which attempts to place the ML model into the first bin that can accommodate it. Best fit is a greedy algorithm that searches all the serving containers and finds the smallest free space (or other resource metric) to allocate for the model. Worst fit is a greedy algorithm that searches all the containers for the largest free space (or other resource metric) to allocate for the model. Any combination or permutation of these bin packing algorithms can be utilized.

These principles and properties of the methods and processes of the routing manager can be specifically applied to different use cases. One use case is where a new cluster or version of an ML framework is added to the ML serving infrastructure. When a new cluster of serving containers is deployed for the new ML framework, the cluster will register to the service discovery and configuration system according to the data model (e.g., a container state model). Since no ML models are yet loaded on this new cluster, the routing manager will not do any model loading or rebalancing on this new cluster.

Another use case is where a version of an ML framework is discontinued, or an ML framework is entirely discontinued. A de-registration process occurs when a cluster gets terminated so that its metadata is removed from service discovery and configuration system 111 (e.g., from data structures like the container state and model mapping). This does not initiate a rebalance as there is no model that needs to be moved or loaded again.

One use case is where a new node (i.e., service container) in the cluster is added. When a new node is added, the serving container will update the service discovery and configuration system 111 (e.g., data structures like the container state). The routing manager 175 will be notified of the change (e.g., via a monitor of the data structures). In this use case, based on an output of the bin packing algorithm, the routing manager can kickoff a rebalancing.

The use cases include when a node (serving container) dies unexpectedly, or gracefully. When a node dies, the serving container heart beat to service discovery and configuration system will start failing. This failure of the heart beat updates the container state data structure in the service discovery and configuration system 111. As a result, the routing manager 175 will be notified and can initiate a rebalance if needed.

The use cases further include where a new version of a model is available. In some implementations, the ML serving infrastructure relies on the scoring requests that are coming to routing service 103 to decide whether or not to load a new model. In the case of a request for a new model, the routing service 103 will call the routing manager 175 to load the new model. The routing manager will determine the containers that the model needs to be loaded and it will update the expected models data structure information for those containers in the service discovery and configuration system 111.

The use cases further include where a version of an ML model is discontinued. There are few different ways that an ML model could get discontinued. Either the discontinuation event is outside of the ML service infrastructure (e.g., a new model is trained on orchestration), or the ML model cache is expired. In case of the discontinuation event happens outside of ML service infrastructure, the routing manager can un-load the ML model. If the model cache has expired, the routing manager 175 can implement a callback for a cache removal listener or use a similar mechanism to update the expected models and actual models data structures of the container in service discovery and configuration system 111. The routing manager 175 can get notified of the change and can initiate a rebalance if needed.

Where balancing, loading, or rebalancing is needed a bin packing algorithm can be utilized using multiple criteria to distribute ML models into different containers. These criteria can include resources such as memory, processing cycles, demand, and similar metrics. For example, each ML model size/capacity can be $(S1, S2, \ldots, Sn)$ and each container can have $(C1, C2, \ldots, Cn)$ capacity. As a result, the routing manager can employ a multi-dimensional bin packing solution. Given a list of models with different memory, processing, demand, and similar requirements, the routing manager needs to place them into a finite number of containers, each with certain memory, processing, and similar capacity, to minimize the number of containers in total.

Figure 3:
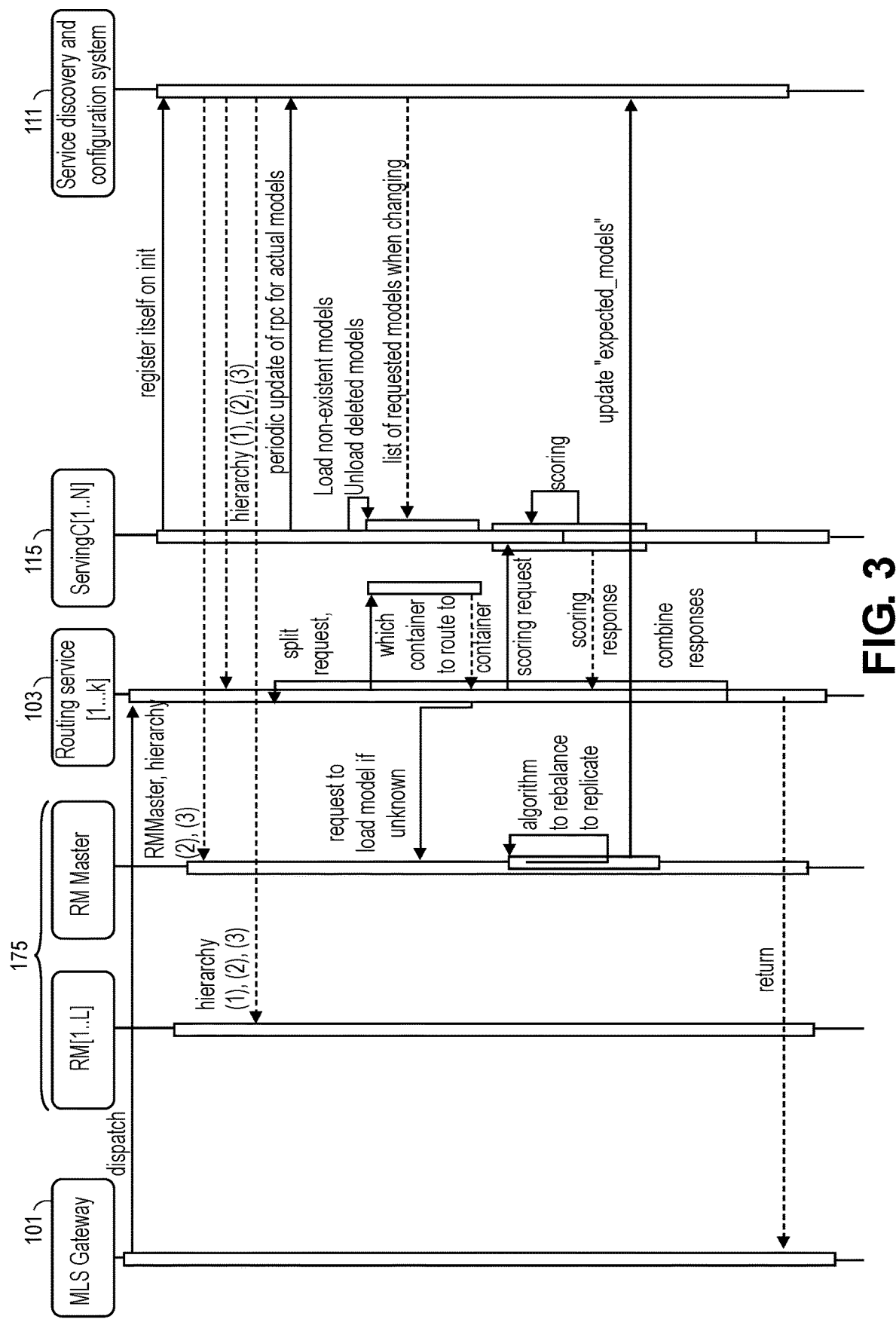
FIG. 3 is a timing diagram illustrating a container balancing process according to some example implementations.

FIG. 3 is a timing diagram illustrating a container balancing process according to some example implementations. The timing diagram shows the operation of the ML serving infrastructure in response to a request being received at the MLS gateway 101. The timing diagram is described with each illustrated operation in sequence starting from the top until the bottom of the timing diagram is reached. The MLS gateway 101 dispatches the request to the routing service 103. In this example, the routing service 103 is implemented in a set of k routing containers (1 . . . k). A set of serving containers 115 has registered with the service discovery and configuration system 111.

The service discovery and configuration system 111 correlates the set of n serving containers (1 . . . n) with a hierarchy of the routing manager 175. The routing manager can be implemented as a set of instances or containers to avoid having a single point of failure in the ML serving infrastructure. In order for routing manager 175, routing service 103, which can be a set of routing containers, and the serving containers 115 to communicate without undue cross traffic is a hierarchy of nodes is used to represent states needed to decide what to do at any particular point of time.

In the example implementation, the routing manager is implemented in a replicated fashion with one instance that will act as a master, while other instances will be in hot standby ready to take over if the master fails based on the notification coming from the service discovery and configuration system 111. The routing manager performs loading, rebalancing, deleting, and replicating the ML models and the other components support the routing manager 175 in terms of supplying the routing manager 175 with all the information it needs to make decisions. The service discovery and configuration system 111 and routing manager 175 maintain a hierarchy to give a full picture of what ML models are initially assigned to specific service containers and what ML models are actually currently assigned. This information can be maintained as a list of expected models as a model mapping hierarchy and a list actual models. The expected models data can be maintained at the routing manager while the actual models are maintained at the respective serving containers. The routing manager can periodically compare and where the lists do not match the routing manager 175 will load/delete an ML model from the local cache of a serving container and update the actual model list at the serving container accordingly.

Replication of popular models requires some stats based on which decision can be made whether to replicate certain model to 2 or more serving containers in order not to overload any given serving container. The hierarchy of mapped models can include statistics that can be periodically updated by respective serving containers (e.g., once in X timeUnits (e.g., 1 hour)). The routing manager reacts to those updates and subsequently feeds the updates into a decision making process about replication, rebalancing, and loading. Thus, in the timing diagram the three dotted lines indicating 'hierarchy (1), (2), (3), represent this coordination of the service discovery configuration system 11 with the routing service 103 and routing manager 175 to establish the hierarchy of n serving containers with the set of 1 routing managers (1 . . . L).

The timing diagram also shows that the serving containers 115 provide a periodic update of the actual models assigned to each of the serving containers 115 via a remote procedure call (RPC) or similar mechanism. The routing service 103 can decide to split a received request and identify which containers to route the request and/or split requests. The serving containers 115 load models that have been assigned to them and unload ML models that are no longer assigned to them. If any of the ML models identified by the received requests are not loaded in a serving container 115, then the routing service 103 sends a request to the routing manager 175 to add the ML model to the set of serving containers 115. If the ML model is available in the serving containers 115, then the routing service 103 sends the request (i.e., a scoring request) to the appropriate serving container 115. The ML model at the serving container 115 performs the scoring (i.e., processes the request) and provides a scoring response to the routing service 103.

Where a routing manager (e.g., at the routing manager master) detects that a rebalancing or replicating is needed or metrics are reported that trigger an analysis, the process for rebalancing and/or replicating is triggered. As a result of request for ML model loads, rebalancing, or replicating, the routing manager 175 can update the expected models and forward the expected models to the service discovery and configurations system 111. As scoring responses are returned to the routing service 103, these responses can be combined in cases where an initial request was split into sub-requests. The combined response is then returned to the MLS gateway, which in turn sends the response to the requesting client application.

As mentioned, data is stored in service discovery and configuration system to be acted on when there is change in the ML models and/or serving containers available. This data is updated under certain use case scenarios. When a new cluster or version of a ML framework is added, the cluster and the serving containers therein will register to service discovery and configuration system which records the state of each cluster and serving container in a container state data structure. Since no models are yet loaded on this new cluster, the routing manager does not do any model loading or rebalancing on this new cluster.

In the case where a version of an ML Framework is discontinued, a de-registration process can be triggered where a cluster gets terminated so that its metadata gets removed from data structures of the service discovery and configuration system (e.g., the container state and model mapping data structures). This will not initiate a rebalance as there is no model that needs to be moved or loaded again.

In a case where a new node (i.e., service container) in the cluster is added, the service container will update the container state at the service discovery and configuration system. The routing manager will get notified of the change via a monitor it establishes on these data structures. In this case, based on the output of the model loading strategy implemented by the routing manager, the routing manager can kickoff a rebalancing.

In the case where a node (serving container) dies unexpectedly, or gracefully, its heart beat to the service discovery and configuration system will start failing. This updates the container state in the service discovery and configuration manager. As a result, the routing manager will be notified and can initiate a rebalance if needed.

In the case where a new version of a model is available, this case can be triggered by receipt of a scoring request specifying a new version of a model. In case of a request for a new version of a model at the routing service, the routing service will call the routing manager to load the new model. The routing manager will determine the containers that the model needs to be loaded into and will update the expected models info for those containers in the service discovery and configuration system.

In the case where an older version of model is discontinued, there are few different ways that a model could be discontinued. Either the discontinuation event is outside of the ML services infrastructure (e.g., a new model is trained on orchestration), or the model cache has expired. If the discontinuation event happens outside of the ML services infrastructure, the routing manager can un-load the model. If the model cache has expired, the routing manager can update the expected models and actual models of the container in service discovery and configuration system. The routing manager will be notified of the change and could potentially initiate a rebalance if needed.

Figure 4:
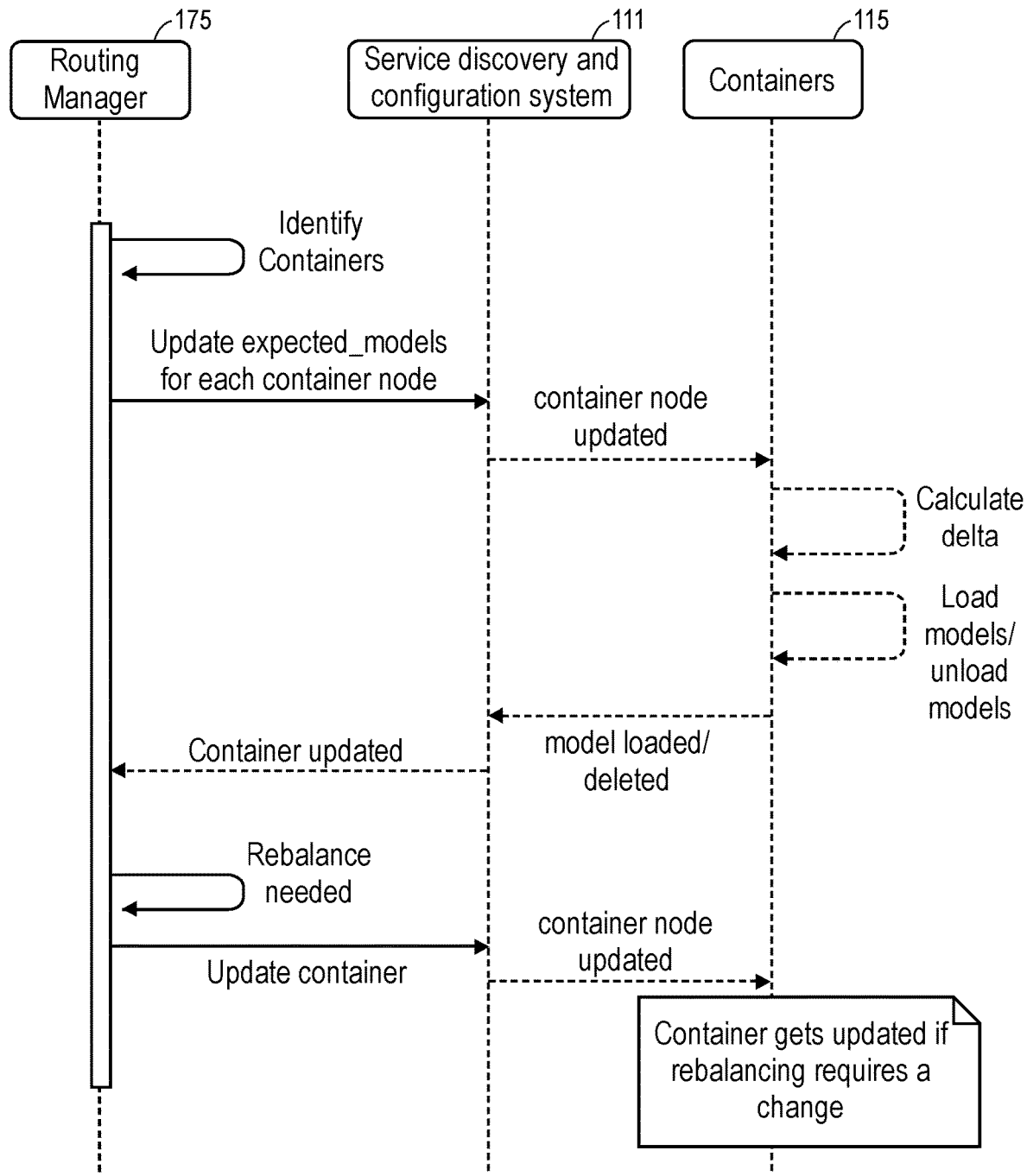
FIG. 4 is a timing diagram illustrating a loading and/or unloading process according to some example implementations.

FIG. 4 is a timing diagram illustrating a loading and/or unloading process according to some example implementations. The process of loading or unloading an ML model can be triggered in response to a call to the routing manager where there is a request to be processed. The routing manger receive a model identifier from the routing service or similar component. The routing manager is responsible for identifying which containers to load the model on. Due to the high model loading latency, this can be an asynchronous call. The output of this request would be the containers that it has decided to load the models onto.

In the timing diagram, the routing manager identifies 175 the containers to load a model onto sing any bin packing or similar algorithm. The expected models structure is updated at the service discovery and configuration system 111. This information is passed to the respective containers 115 either in response to the update or on a periodic basis. The containers 115 determine the differences between the updated expected model information and their local actual models information. Where models are being added or removed, the containers implement either a load or an unload of the respective models. A confirmation of the load or unload is returned to the service discovery and configuration system 111. The service discovery and configuration system 11 updates local container state and related data structures and notifies the routing manager 175 either directly or by the update of the monitored data structures of the changes.

The routing manager 175 can analyze the current status of the model distribution to the containers and related metrics to determine whether a rebalance is needed. If a rebalance is needed, then the expected models data structure is updated according to the rebalance and applied bin packing algorithm. The update to the expected models is then passed to the service discovery and configuration system 111, which in turn causes the information to be passed to the containers 115. The containers 115 again perform a delta calculation to determine whether models need to be loaded, deleted, or moved.

Figure 5:
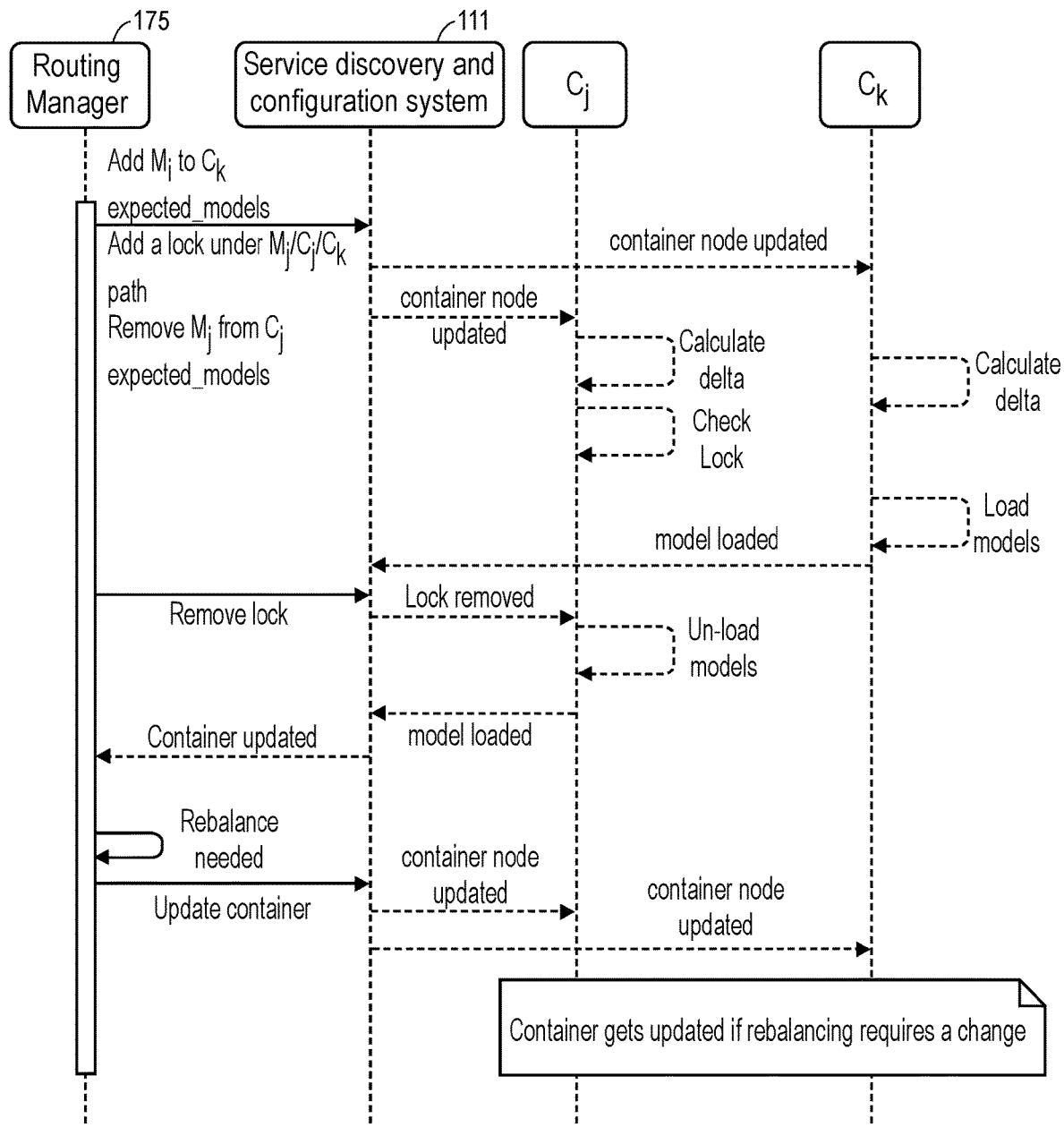
FIG. 5 is a timing diagram illustrating a machine learning model movement process according to some example implementations.

FIG. 5 is a timing diagram illustrating a machine learning model movement process according to some example implementations. When a new serving container joins the pool or rebalancing of the ML models are happening, there can be a need to move some models around from one container to another. As a result, the routing manager supports loading the model in the new container and un-loading it from the old one so that there is not any unavailability of the model. In one example implementation, the routing manager is moving the Mi model from Cj container to Ck container. In this illustrated example case, the moving process includes updating the service discovery and configuration system in a transaction to add Mi to Ck expected models, add a lock under the Mi/Cj/Ck path, and remove the model Mi from the Cj container expected models. This transaction is promulgated to the Ck container and the Cj container, which each perform a delta calculation to identify the changes to the models at each container. Container Cj will check the lock and wait until the lock is removed to unload the model. Container Ck will load the model and the routing manager will remove the lock upon confirmation of the model load at Ck. The Cj container can then complete the unload of the model.

The routing manager 175 can subsequently calculate if rebalancing is needed, in which case updates to the expected models for the containers are promulgated to the serving container and configuration manager 111, which in turn provides the updates to the containers. The deltas are computed and models are loaded, unloaded, or moved according to the updates.

Figure 6:
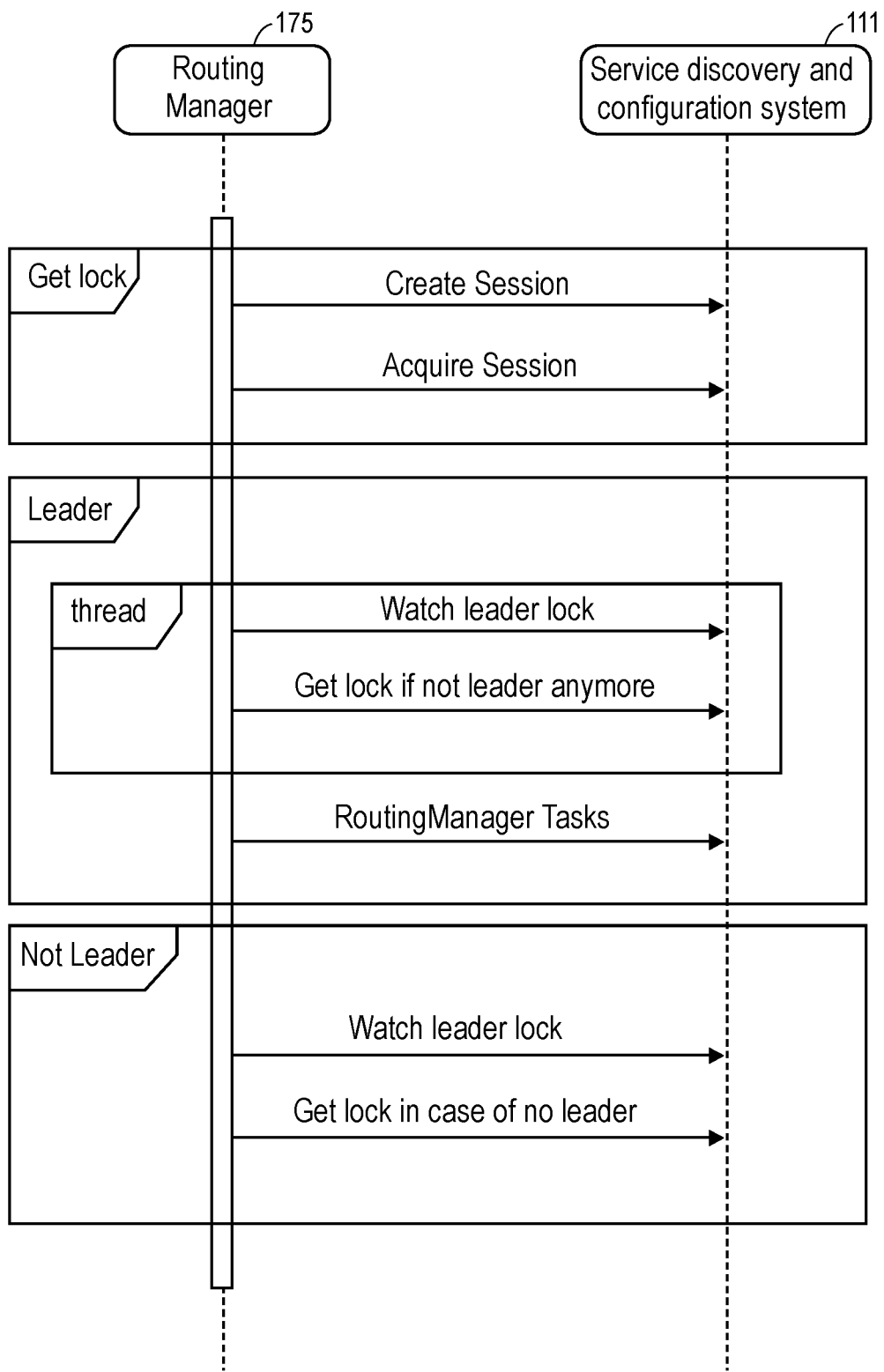
FIG. 6 is a timing diagram illustrating an election process according to some example implementations.

FIG. 6 is a diagram of routing manager leader election. To ensure proper operation and consistency, e.g., to avoid a split brain issue, only one routing manager instance is responsible for the whole state of the containers and models at any moment with hot swap replicas ready to go in case of the master failure. As a result, the routing manager utilizes a leader election mechanism. In the illustration each routing manager instance 175 can establish a connection with the service discovery and configuration system 111 to attempt to get a lock on the data structures maintained by the routing manager master. A session is created with the service discovery and configuration system 111, then an acquire lock session is attempted. If the routing manager becomes the master, then a thread is established to watch the leader lock and attempt to acquire the lock if leadership lost. The leader can also perform the routing manager tasks using the connection with the service discovery and configuration system. For an instance of the routing manager that is not the leader (i.e., not the master), then the session is utilized to watch the leader lock and attempt to acquire the lock when there is no leader. If successful, then a thread is established according to the leader paradigm to watch the lock and acquire while also performing the routing manager tasks.

Example Electronic Devices and Environments
Electronic Device and Machine-Readable Media One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 7A:
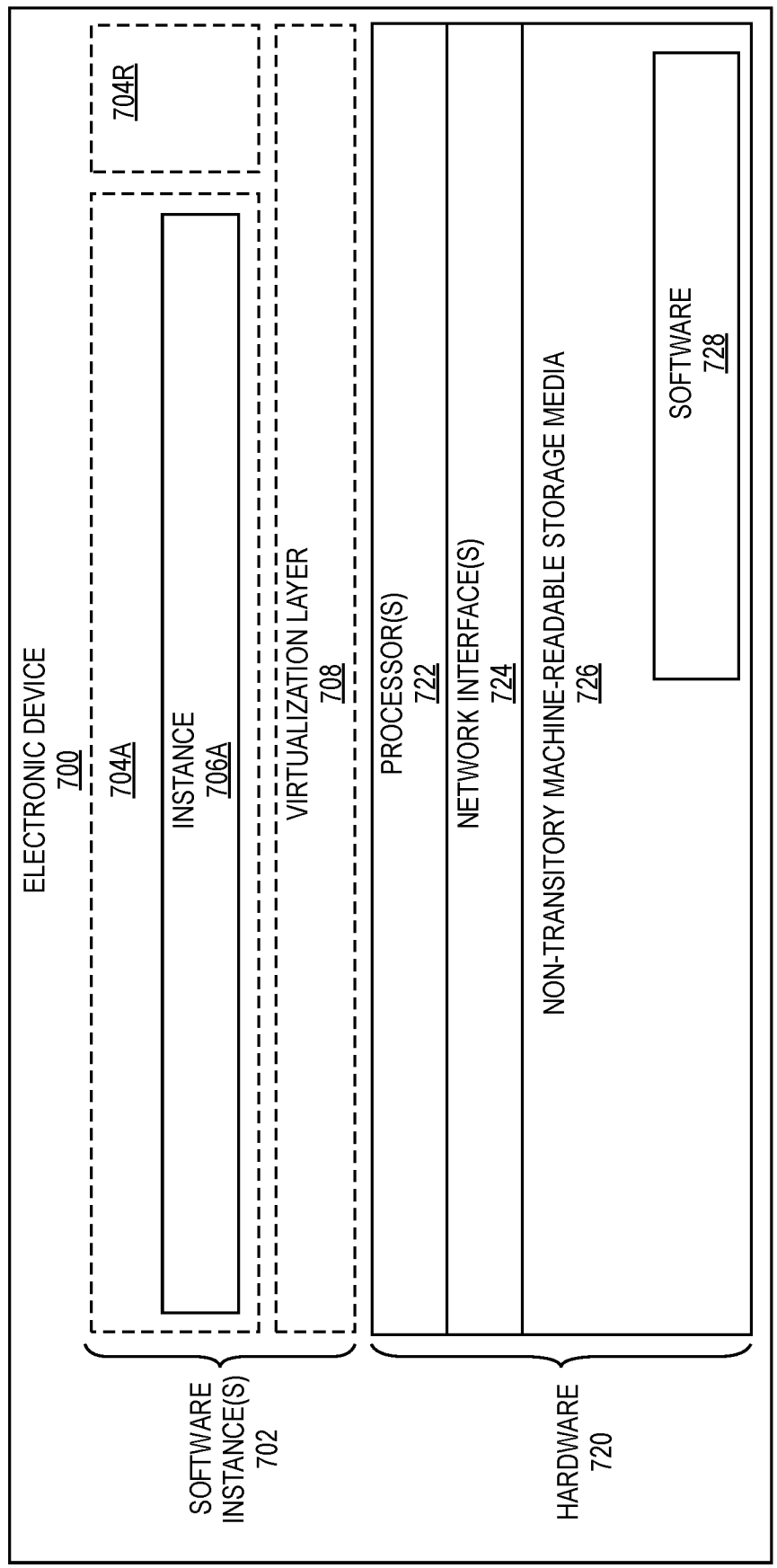
FIG. 7A is a block diagram illustrating an electronic device according to some example implementations.

FIG. 7A is a block diagram illustrating an electronic device 700 according to some example implementations. FIG. 7A includes hardware 720 comprising a set of one or more processor(s) 722, a set of one or more network interfaces 724 (wireless and/or wired), and machine-readable media 726 having stored therein software 728 (which includes instructions executable by the set of one or more processor(s) 722). The machine-readable media 726 may include non-transitory and/or transitory machine-readable media. Each of the previously described clients and the routing manager may be implemented in one or more electronic devices 700. In one implementation: 1) each of the clients is implemented in a separate one of the electronic devices 700 (e.g., in end user devices where the software 728 represents the software to implement clients to interface directly and/or indirectly with the routing manager (e.g., software 728 represents a web browser, a native client, a portal, a command-line interface, and/or an application programming interface (API) based upon protocols such as Simple Object Access Protocol (SOAP), Representational State Transfer (REST), etc.)); 2) the Routing manager is implemented in a separate set of one or more of the electronic devices 700 (e.g., a set of one or more server devices where the software 728 represents the software to implement the routing manager); and 3) in operation, the electronic devices implementing the clients and the routing manager would be communicatively coupled (e.g., by a network) and would establish between them (or through one or more other layers and/or or other services) connections for submitting requests to the ML models where routing is assisted by the routing manager and returning responses to the clients. Other configurations of electronic devices may be used in other implementations (e.g., an implementation in which the client and the Routing manager are implemented on a single one of electronic device 700).

During operation, an instance of the software 728 (illustrated as instance 706 and referred to as a software instance; and in the more specific case of an application, as an application instance) is executed. In electronic devices that use compute virtualization, the set of one or more processor(s) 722 typically execute software to instantiate a virtualization layer 708 and one or more software container(s) 704A-704R (e.g., with operating system-level virtualization, the virtualization layer 708 may represent a container engine (such as Docker Engine by Docker, Inc. or rkt in Container Linux by Red Hat, Inc.) running on top of (or integrated into) an operating system, and it allows for the creation of multiple software containers 704A-704R (representing separate user space instances and also called virtualization engines, virtual private servers, or jails) that may each be used to execute a set of one or more applications; with full virtualization, the virtualization layer 708 represents a hypervisor (sometimes referred to as a virtual machine monitor (VMM)) or a hypervisor executing on top of a host operating system, and the software containers 704A-704R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 728 is executed within the software container 704A on the virtualization layer 708. In electronic devices where compute virtualization is not used, the instance 706 on top of a host operating system is executed on the "bare metal" electronic device 700. The instantiation of the instance 706, as well as the virtualization layer 708 and software containers 704A-704R if implemented, are collectively referred to as software instance(s) 702.

Alternative implementations of an electronic device may have numerous variations from that described above. For example, customized hardware and/or accelerators might also be used in an electronic device.

Example Environment

Figure 7B:
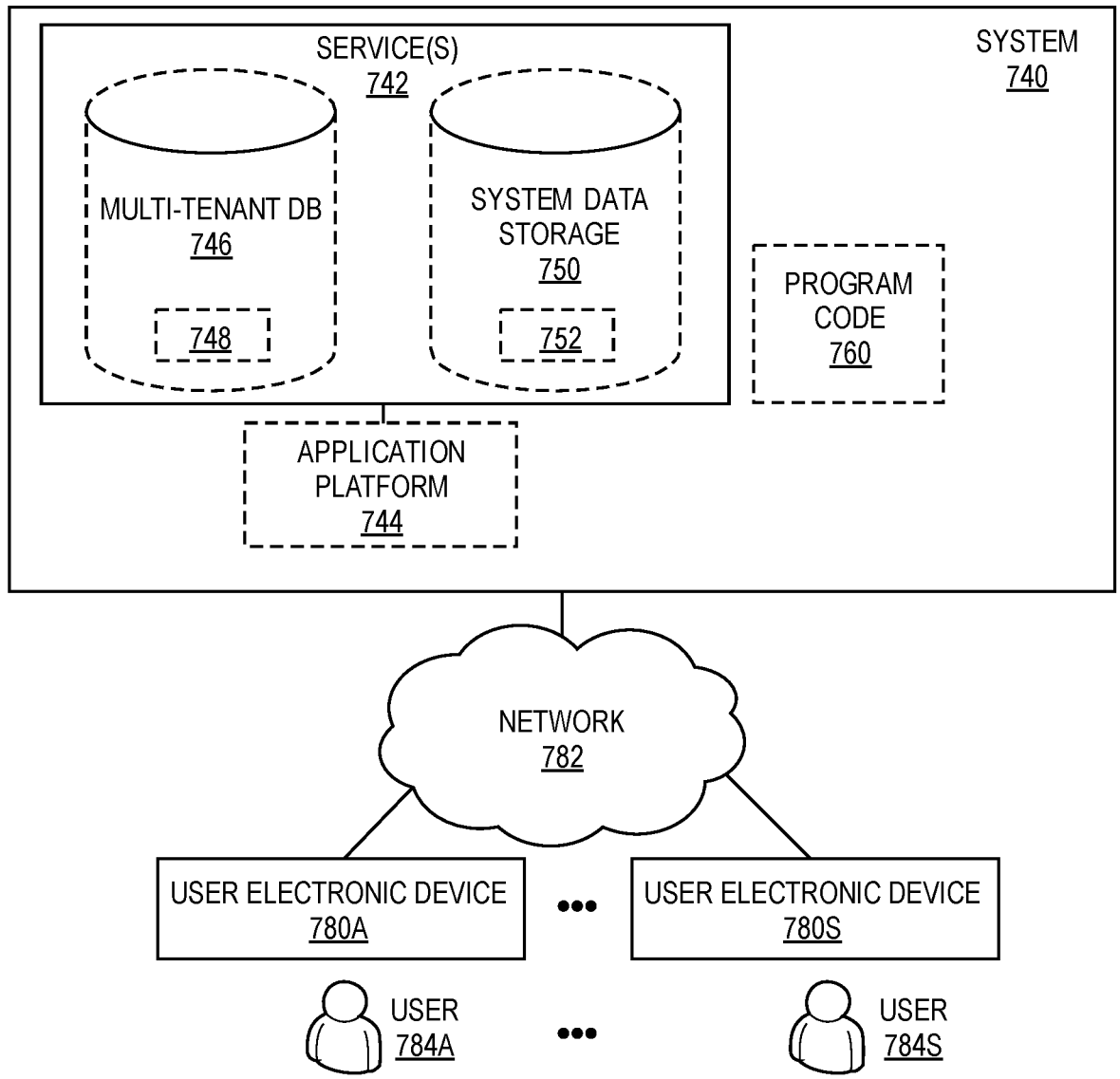
FIG. 7B is a block diagram of a deployment environment according to some example implementations.

FIG. 7B is a block diagram of a deployment environment according to some example implementations. A system 740 includes hardware (e.g., a set of one or more server devices) and software to provide service(s) 742, including the Routing manager. In some implementations the system 740 is in one or more datacenter(s). These datacenter(s) may be: 1) first party datacenter(s), which are datacenter(s) owned and/or operated by the same entity that provides and/or operates some or all of the software that provides the service(s) 742; and/or 2) third-party datacenter(s), which are datacenter(s) owned and/or operated by one or more different entities than the entity that provides the service(s) 742 (e.g., the different entities may host some or all of the software provided and/or operated by the entity that provides the service(s) 742). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 740 is coupled to user devices 780A-780S over a network 782. The service(s) 742 may be on-demand services that are made available to one or more of the users 784A-784S working for one or more entities other than the entity which owns and/or operates the on-demand services (those users sometimes referred to as outside users) so that those entities need not be concerned with building and/or maintaining a system, but instead may make use of the service(s) 742 when needed (e.g., when needed by the users 784A-784S). The service(s) 742 may communicate with each other and/or with one or more of the user devices 780A-780S via one or more APIs (e.g., a REST API). In some implementations, the user devices 780A-780S are operated by users 784A-784S, and each may be operated as a client device and/or a server device. In some implementations, one or more of the user devices 780A-780S are separate ones of the electronic device 700 or include one or more features of the electronic device 700.

In some implementations, the system 740 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 740 is a multi-tenant cloud computing architecture supporting multiple services, such as one or more of the following types of services: Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM).

For example, system 740 may include an application platform 744 that enables PAAS for creating, managing, and executing one or more applications developed by the provider of the application platform 744, users accessing the system 740 via one or more of user devices 780A-780S, or third-party application developers accessing the system 740 via one or more of user devices 780A-780S.

In some implementations, one or more of the service(s) 742 may use one or more multi-tenant databases 746, as well as system data storage 750 for system data 752 accessible to system 740. In certain implementations, the system 740 includes a set of one or more servers that are running on server electronic devices and that are configured to handle requests for any authorized user associated with any tenant (there is no server affinity for a user and/or tenant to a specific server). The user devices 780A-780S communicate with the server(s) of system 740 to request and update tenant-level data and system-level data hosted by system 740, and in response the system 740 (e.g., one or more servers in system 740) automatically may generate one or more Structured Query Language (SQL) statements (e.g., one or more SQL queries) that are designed to access the desired information from the multi-tenant database(s) 746 and/or system data storage 750.

In some implementations, the service(s) 742 are implemented using virtual applications dynamically created at run time responsive to queries from the user devices 780A-780S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 760 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 744 includes an application setup mechanism that supports application developers' creation and management of applications, which may be saved as metadata by save routines. Invocations to such applications, including the Routing manager, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 782 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a 4$^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 740 and the user devices 780A-780S.

Each user device 780A-780S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 740. For example, the user interface device can be used to access data and applications hosted by system 740, and to perform searches on stored data, and otherwise allow one or more of users 784A-784S to interact with various GUI pages that may be presented to the one or more of users 784A-784S. User devices 780A-780S might communicate with system 740 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 780A-780S might include an HTTP client, commonly referred to as a "browser," for sending and receiving HTTP messages to and from server(s) of system 740, thus allowing users 784A-784S of the user devices 780A-780S to access, process and view information, pages and applications available to it from system 740 over network 782.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A method for managing containers in a machine learning (ML) serving infrastructure, the method comprising:
   receiving or detecting an update of container metrics including resource usage and serviced requests per ML model or per container, where a plurality of ML models are hosted by and distributed amongst a plurality of containers;
   processing the container metrics per ML model or per container to determine recent resource usage and serviced requests per ML model or per container;
   rebalancing the distribution of ML models to containers in response to detecting a load imbalance between containers or detecting a stressed container;
   identifying the plurality of containers as available to execute ML models;
   updating an expected model assignment for each container in the plurality of containers;
   sending the expected model assignment to a container manager to implement loading or unloading of ML models at each container of the plurality of containers;

updating the expected model assignment for each container in the plurality of containers in response to the rebalancing of the distribution of ML models to the plurality of containers; and sending the updated expected model assignment to the container manager to implement moving of ML models between containers according to the updated expected model assignment.

2. The method of claim 1, further comprising:

identifying load imbalance in the plurality of containers where a delta of a load of at least one container compared to an average load of the plurality of containers exceeds a first threshold; and identifying the stressed container in the plurality of containers where a load of the stressed container exceeds a second threshold.

3. The method of claim 1, further comprising:

identifying a first ML model to move from a first container to a second container;

assigning the first ML model to the first container in the expected model assignment;

locking a routing path of the first ML model to the first container; and sending the expected model assignment to the container manager to implement loading of the first ML model at the second container.

4. The method of claim 3, further comprising:

receiving confirmation of the first ML model being loaded in the second container; and unlocking the routing path of the first ML model to the first container.

5. The method of claim 1, wherein the ML models service scoring requests from tenant applications.

6. The method of claim 5, wherein the plurality of containers are serving containers to execute ML models loaded by the respective serving container.

7. A non-transitory machine-readable storage medium that provides instructions that, if executed by a set of one or more processors, are configurable to cause the set of one or more processors to perform operations comprising:

receiving or detecting an update of container metrics including resource usage and serviced requests per machine learning (ML) model or per container, where a plurality of ML models are hosted by and distributed amongst a plurality of containers;

processing the container metrics per ML model or per container to determine recent resource usage and serviced requests per ML model or per container; and rebalancing the distribution of ML models to containers in response to detecting a load imbalance between containers or detecting a stressed container;

identifying the plurality of containers as available to execute ML models;

updating an expected model assignment for each container in the plurality of containers;

sending the expected model assignment to a container manager to implement loading or unloading of ML models at each container of the plurality of containers;

updating the expected model assignment for each container in the plurality of containers in response to the rebalancing of the distribution of ML models to the plurality of containers; and sending the updated expected model assignment to the container manager to implement moving of ML models between containers according to the updated expected model assignment.

8. The non-transitory machine-readable storage medium of claim 7, having further instructions that if executed cause the set of one or more processor to perform operations further comprising:

identifying load imbalance in the plurality of containers where a delta of a load of at least one container compared to an average load of the plurality of containers exceeds a first threshold; and identifying the stressed container in the plurality of containers where a load of the stressed container exceeds a second threshold.

9. The non-transitory machine-readable storage medium of claim 7, having further instructions that if executed cause the set of one or more processor to perform operations further comprising:

identifying a first ML model to move from a first container to a second container;

assigning the first ML model to the first container in the expected model assignment;

locking a routing path of the first ML model to the first container; and sending the expected model assignment to the container manager to implement loading of the first ML model at the second container.

10. The non-transitory machine-readable storage medium of claim 9, having further instructions that if executed cause the set of one or more processor to perform operations further comprising receiving confirmation of the first ML model being loaded in the second container; and unlocking the routing path of the first ML model to the first container.

11. The non-transitory machine-readable storage medium of claim 7, wherein the ML models service scoring requests from tenant applications.

12. The non-transitory machine-readable storage medium of claim 11, wherein the plurality of containers are serving containers to execute ML models loaded by the respective serving container.

13. An apparatus comprising:

a non-transitory machine-readable storage medium that stores software; and a set of one or more processors, coupled to the non-transitory machine-readable storage medium, to execute the software that implements a routing manager and that is configurable to:

receive or detecting an update of container metrics including resource usage and serviced request per machine learning (ML) model or per container, where a plurality of ML models are hosted by and distributed amongst a plurality of containers;

process the container metrics per ML model or per container to determine recent resource usage and serviced requests per ML model or per container;

rebalance the distribution of ML models to containers in response to detecting a load imbalance between containers or detecting a stressed container;

identify the plurality of containers as available to execute ML models;

update an expected model assignment for each container in the plurality of containers;

send the expected model assignment to a container manager to implement loading or unloading of ML models at each container of the plurality of containers;

update the expected ML model assignment for each container in the plurality of containers in response to the rebalancing of the distribution of ML models to the plurality of containers; and send the updated expected model assignment to the container manager to implement moving of ML models between containers according to the updated expected model assignment.

14. The apparatus of claim 13, wherein the routing manager is further configured to:

identifying load imbalance in the plurality of containers where a delta of a load of at least one container compared to an average load of the plurality of containers exceeds a first threshold; and identifying the stressed container in the plurality of containers where a load of the stressed container exceeds a second threshold.

15. The apparatus of claim 13, wherein the routing manager is further configured to:

identify a first ML model to move from a first container to a second container;

assign the first ML model to the first container in the expected model assignment;

lock a routing path of the first ML model to the first container; and send the expected model assignment to the container manager to implement loading of the first ML model at the second container.

16. The apparatus of claim 15, wherein the routing manager is further configured to:

receive confirmation of the first ML model being loaded in the second container; and unlock the routing path of the first ML model to the first container.

17. The apparatus of claim 13, wherein the ML models service scoring requests from tenant applications.

18. The apparatus of claim 17, wherein the plurality of containers are serving containers to execute ML models loaded by the respective serving container.

* * * * *